(12) United States Patent
Shaw

(10) Patent No.: US 9,146,309 B2
(45) Date of Patent: Sep. 29, 2015

(54) SUPER DELTA MONOPULSE BEAMFORMER

(71) Applicant: The Aerospace Corporation, El Segundo, CA (US)

(72) Inventor: Thomas Justin Shaw, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 319 days.

(21) Appl. No.: 13/779,471

(22) Filed: Feb. 27, 2013

(65) Prior Publication Data

US 2014/0240023 A1 Aug. 28, 2014

(51) Int. Cl.

| G01S 13/44 | (2006.01) |
|---|---|
| H01Q 3/40 | (2006.01) |
| G06G 7/14 | (2006.01) |
| G06G 7/12 | (2006.01) |
| H01Q 3/26 | (2006.01) |
| G01S 13/00 | (2006.01) |
| H01Q 3/00 | (2006.01) |

(52) U.S. Cl.
CPC . *G01S 13/44* (2013.01); *G06G 7/12* (2013.01); *G06G 7/14* (2013.01); *H01Q 3/26* (2013.01); *H01Q 3/40* (2013.01)

(58) Field of Classification Search
CPC ........... G06G 7/12; G06G 7/122; G06G 7/14; G01S 7/02; G01S 7/28; G01S 7/2813; G01S 13/02; G01S 13/06; G01S 13/42; G01S 13/44; G01S 13/4409; G01S 13/4418; G01S 13/4427; G01S 13/4436; G01S 13/4445; G01S 13/4454; G01S 13/4463; H01Q 3/24; H01Q 3/242; H01Q 3/245; H01Q 3/247; H01Q 3/26; H01Q 3/30; H01Q 25/00; H01Q 25/02; H01Q 3/34; H01Q 3/40
USPC ............. 342/73–81, 147, 149–154, 368–377, 342/175, 195, 350, 159
See application file for complete search history.

(56) References Cited

U.S. PATENT DOCUMENTS

| 4,011,564 | A | * | 3/1977 | Gulick, Jr. | 342/150 |
|---|---|---|---|---|---|
| 4,821,039 | A | * | 4/1989 | Crane | 342/153 |
| 5,017,927 | A | * | 5/1991 | Agrawal et al. | 342/371 |
| 5,241,318 | A | * | 8/1993 | Howard | 342/149 |
| 5,311,192 | A | * | 5/1994 | Varga et al. | 342/159 |
| 8,427,371 | B2 | * | 4/2013 | Pozgay | 342/373 |

FOREIGN PATENT DOCUMENTS

FR    2586109 A1 * 2/1987 ............... G01S 7/40

OTHER PUBLICATIONS

N. Yang et al, "Monopulse comparator with frequency-independent delta channel nulls for high-resolution tracking radar"; Electronics Letters; vol. 47, No. 5; Mar. 3, 2011; pp. 339-340.*
"Overview of Generalized Monopulse Estimation," Ulrich Nickel, IEEE A&E Systems Magazine, vol. 21, No. 6 (Jun. 2006).

* cited by examiner

*Primary Examiner* — Bernarr Gregory
(74) *Attorney, Agent, or Firm* — Leonardpatel PC

(57) ABSTRACT

An improved approach to direction finding using a super delta monopulse beamformer is disclosed. A super delta channel signal that includes direction finding information from two circular delta channels is formed and output by the super delta monopulse beamformer. This super delta channel signal uses only two channels, but is able to realize the accuracy of conventional three channel systems.

21 Claims, 9 Drawing Sheets

SUPER DELTA MONOPULSE BEAMFORMER

FIELD

The present invention generally pertains to direction finding, and more specifically, to a super delta monopulse beamformer that combines two information-sharing circular delta channels coherently to form one hybrid symmetric delta channel (i.e., a super delta channel) that contains all of the direction finding information of the two circular delta channels.

BACKGROUND

Approaches to direction finding typically use relative phase and amplitude differences between channels to estimate the angle of arrival (AoA) of the incoming wave. Two conventional approaches employed in direction finding systems use either two or three channels, with higher precision in the three channel system. Signal processing is performed to obtain the azimuth and elevation.

Conventional direction finding beamformers typically create a sum channel and either one or two difference (i.e., delta) channels. Three channel systems offer improved accuracy over existing two channel systems at the expense of higher power requirements and more processing due to the requisite increase in the number of channels by 50%. Thus, in conventional systems, designers must choose between higher performance and lower cost (as determined by size, weight, and power).

Angle-of-arrival receivers compare the relative phase and/or gain of two or more input channels in order to estimate the arrival angle from which energy is impinging the aperture. A conventional monopulse aperture has four coplanar quadrants with a beamforming network that creates a single sum channel and one or more difference channels. These four coplanar quadrants may be denoted A, B, C, and D, and these quadrants may represent 90° physical slices the aperture. The four quadrants $100$ of a representative circular aperture are illustrated in FIG. 1. Counterclockwise from the lower left, A is the lower left quadrant, B is the lower right quadrant, C is the upper right quadrant, and D is the upper left quadrant. However, which quadrant of an actual aperture is denoted by which reference letter is relative.

A conventional three channel implementation forms $\Sigma=A+B+C+D$, $\Delta_{az}=A-B-C+D$, and $\Delta_{el}=A+B-C-D$, where $\Sigma$ is the sum channel, $\Delta_{az}$ is the horizontal difference channel (left minus right), and $\Delta_{el}$ is the vertical difference channel (top minus bottom). Such a system is depicted in three channel system $200$ of FIG. 2. A two channel system forms $\Sigma=A+B+C+D$ and one of two symmetrical delta patterns, $\Delta_1=A+jB-C-jD$ (clockwise) or $\Delta_2=A-jB-C+jD$ (counterclockwise), where j is the imaginary number $\sqrt{-1}$. An example is illustrated in two channel system $300$ of FIG. 3. Note that in FIG. 3, the clockwise circular delta has been selected. Direction finding information is split equally between these two noise-independent circular delta channels. Thus, systems that use a single circular delta channel lose direction finding information. This impacts the radius of uncertainty of the estimated AoA by roughly $\sqrt{2}$. Thus, conventional two channel beamformers, while saving system resources (e.g., power and processing), do not perform direction finding as well as three channel systems. Accordingly, an improved direction finding system that maintains the accuracy of a three channel system with the power and processing requirements, and therefore the cost, of a two channel system may be beneficial.

SUMMARY

Certain embodiments of the present invention may be implemented and provide solutions to the problems and needs in the art that have not yet been fully solved by conventional direction finding systems. For example, certain embodiments of the present invention combine two information-sharing circular delta channels, such as $\Delta_1=A+jB-C-jD$ and $\Delta_2=A-jB-C+jD$, to form one hybrid super delta channel that contains all of the direction finding information of a three channel system. Some embodiments may use existing passive hardware devices to combine the two delta channels into one super delta channel.

In one embodiment of the present invention, a method includes forming, by an analog beamformer, a super delta channel signal. The method also includes outputting, by the analog beamformer, the super delta channel signal.

In another embodiment of the present invention, an apparatus includes a plurality of conjugation components and at least two multipliers. The plurality of conjugation components and the at least two multipliers are configured to produce a super delta channel signal.

In yet another embodiment of the present invention, a computer program is embodied on a non-transitory computer-readable medium. The computer program is configured to cause at least one processor to receive digital data streams including direction finding information. The computer program is also configured to cause the at least one processor to process the received digital data streams to produce a super delta channel signal, and output the super delta channel signal.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
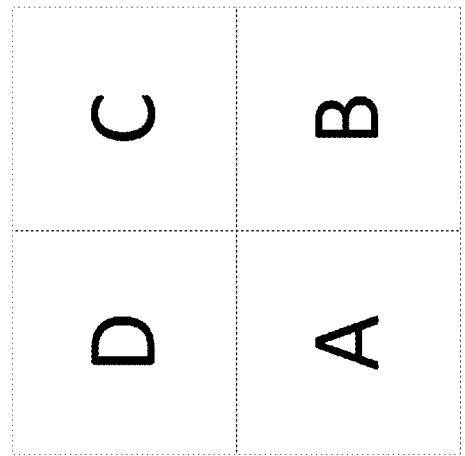
FIG. 1 illustrates four quadrants of an aperture.
Figure 2:
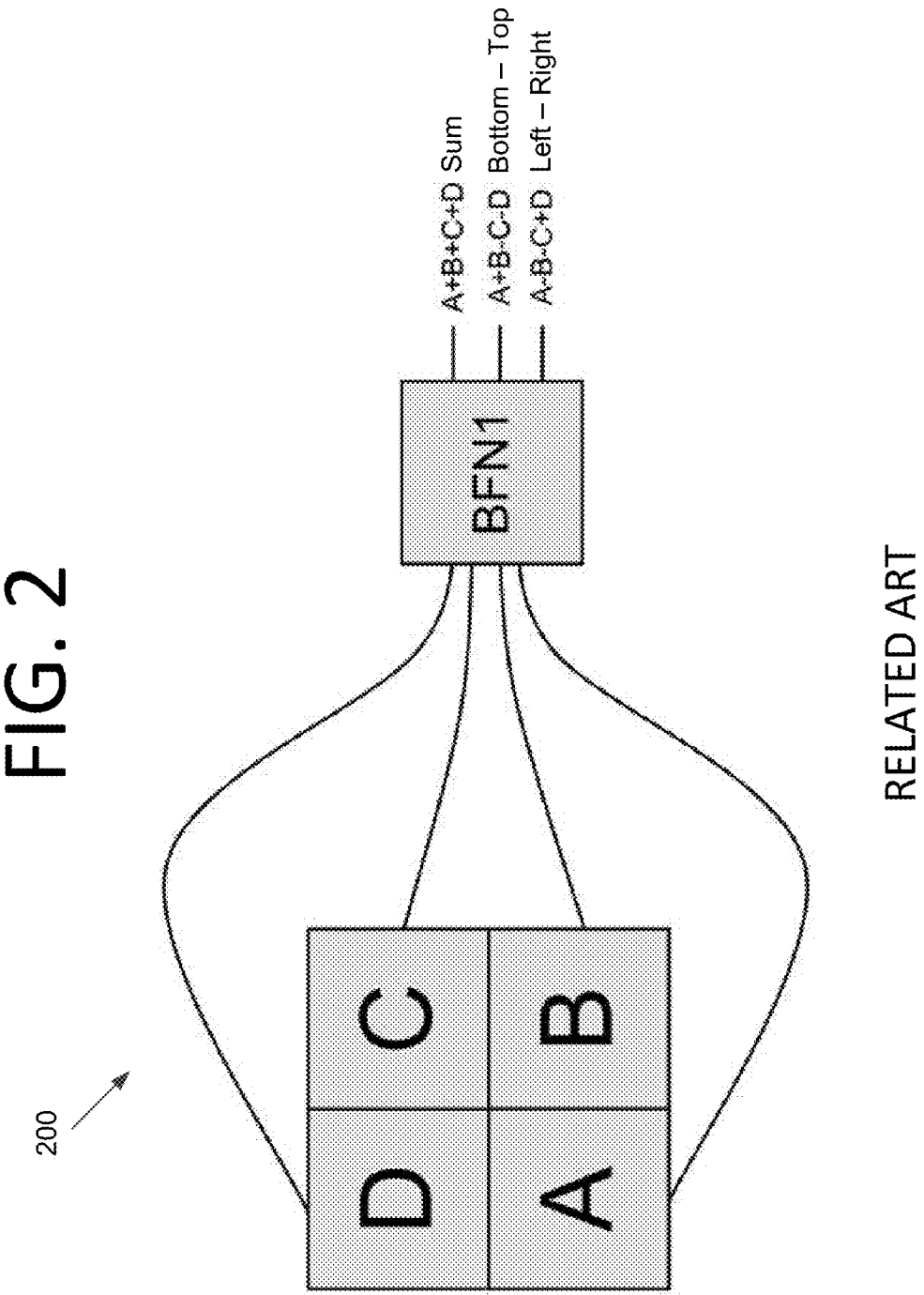
FIG. 2 illustrates a three channel beamformer.
Figure 3:
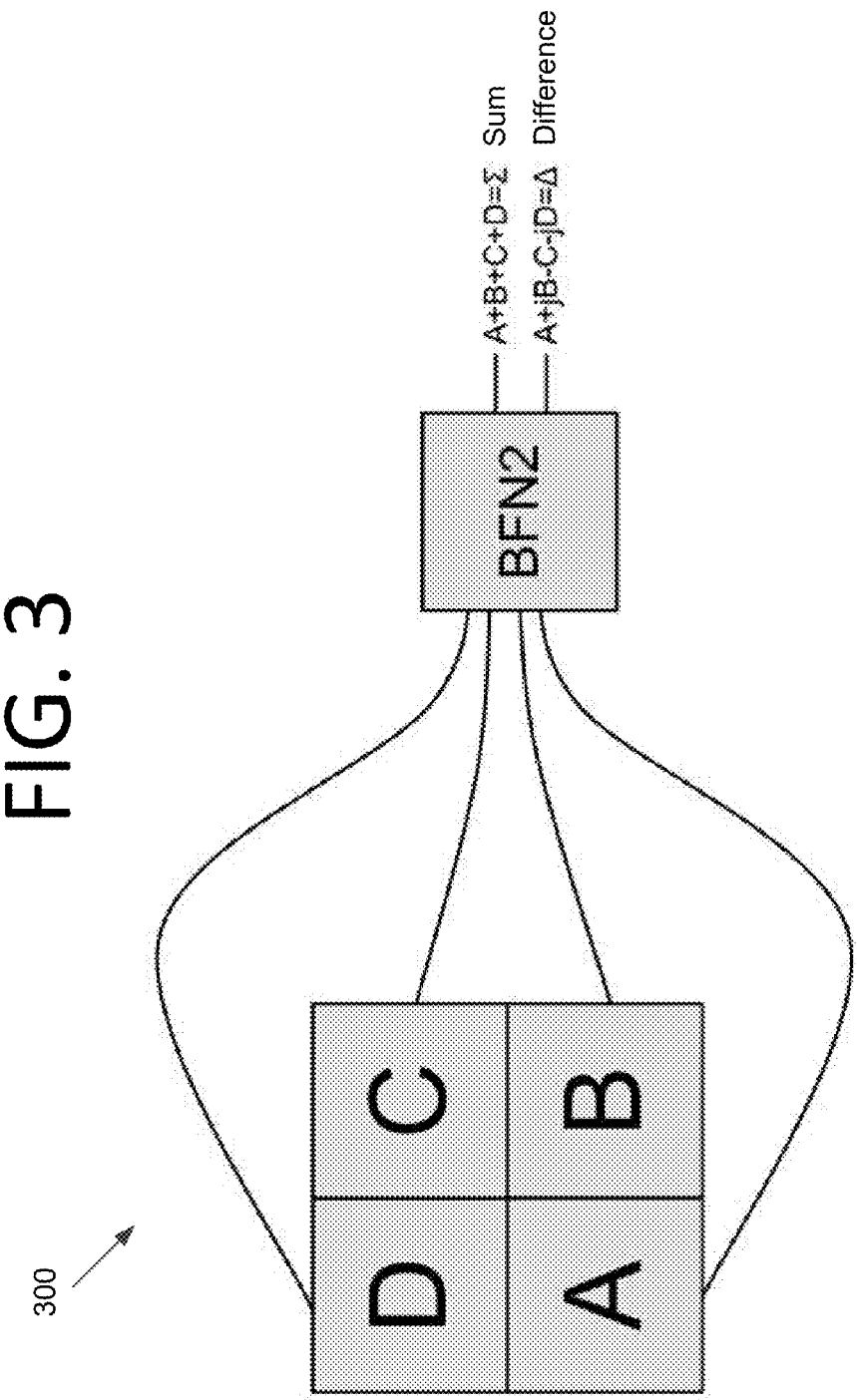
FIG. 3 illustrates a two channel beamformer.

Some embodiments of the present invention combine two circular delta channels into a super delta channel. This allows such embodiments to have the lower power and processing requirements of a two channel beamformer while realizing the accuracy of a three channel beamformer. Furthermore, such embodiments are generally able to be produced and run at a lower cost than a three channel beamformer. Some embodiments could be used for targeting radar systems on the ground or on aircraft/spacecraft, acoustical response (e.g., having a camera point to speaker in room), or for any other purpose that would be appreciated by a person of ordinary skill in the art.

Analysis of Super Delta Theory

In order to better explain super delta monopulse beamformers according to some embodiments of the present invention, it may be helpful to represent two and three channel beamformers in matrix form. A three channel beamformer can be represented as $$\begin{bmatrix} \Sigma \\ \Delta_{az} \\ \Delta_{el} \end{bmatrix} = \begin{bmatrix} 1 & 1 & 1 & 1 \\ 1 & -1 & -1 & 1 \\ 1 & 1 & -1 & -1 \end{bmatrix} \begin{bmatrix} A \\ B \\ C \\ D \end{bmatrix}$$

and, for a two channel beamformer with a clockwise circular delta, $$\begin{bmatrix} \Sigma \\ \Delta_1 \end{bmatrix} = \begin{bmatrix} 1 & 1 & 1 & 1 \\ 1 & j & -1 & -j \end{bmatrix} \begin{bmatrix} A \\ B \\ C \\ D \end{bmatrix}$$

or, more briefly $$v_3 = M_3 v_4$$

$$v_2 = M_2 v_4$$

where $v_3$ is the vector of sum and difference channels for the three channel system, $v_2$ is the vector with the sum channel and circular delta channel for a two channel system, $M_3$ and $M_2$ are the respective matrices on the opposite side of the equation, and $v_4$ represents measurements obtained from each quadrant of the aperture.

Other circular delta channels exist, and they come in orthogonal pairs. For any complex number $z$ with conjugate $\bar{z}$, let $$\begin{bmatrix} \Delta_1(z) \\ \Delta_2(z) \end{bmatrix} = \begin{bmatrix} z & 0 \\ 0 & \bar{z} \end{bmatrix} \begin{bmatrix} 1 & j & -1 & -j \\ 1 & -j & -1 & j \end{bmatrix} \begin{bmatrix} A \\ B \\ C \\ D \end{bmatrix}$$

Another common circular delta channel is $\Delta_1$ ($\sqrt{2}e^{j\pi/4}$), which yields the weights $$[1+j, -1+j, -1-j, 1-j]$$

For practical reasons, certain circular delta channels may be preferable to others, but mathematically, all orthogonal pairs are equivalent in terms of AoA performance since they differ only by the orthogonal matrix $$\begin{bmatrix} z & 0 \\ 0 & \bar{z} \end{bmatrix}$$

Accordingly, without loss of generality, only the case where $z=1$ is discussed below.

The two channel system $[\Sigma, \Delta_1]^T$ can be obtained from the three channel system $[\Sigma, \Delta_{az}, \Delta_{el}]^T$ since $M_2 = TM_3$, where $$T_{2\times 3} = \begin{bmatrix} 1 & 0 & 0 \\ 0 & (1-j)/2 & (1+j)/2 \end{bmatrix}$$

As such, any analysis that can be performed on the three channel system can also be performed on the two channel system by forming the two channel measurements through a transformation by $T_{2\times 3}$ $$v_2 = T v_3$$

Because T is not invertible, and is furthermore not even square, there is no way to reverse this process. In other words, it is not possible to form $v_3$ from a linear transformation of $v_2$.

The two channel system can, however, be augmented with the orthogonal circular delta channel to form a three channel system, $$[\Sigma, \Delta_1, \Delta_2]^T$$

where $$\begin{bmatrix} \Sigma \\ \Delta_1 \\ \Delta_2 \end{bmatrix} = \begin{bmatrix} 1 & 1 & 1 & 1 \\ 1 & j & -1 & -j \\ 1 & -j & -1 & j \end{bmatrix} \begin{bmatrix} A \\ B \\ C \\ D \end{bmatrix}$$

The channel $\Delta_2$ is independent from the original circular delta channel $\Delta_1$ by the Channel Independence Theorem, which is discussed in detail below. Generally speaking, the channels are independent because the complex dot product between the beamforming coefficients $[1, j, -1, -j]$ and $[1, j, -1, j]$ for $\Delta_1$ and $\Delta_2$, respectively, is zero. The optimally processed three-channel circular delta system is equivalent in AoA accuracy to the conventional three channel system because it is possible to go back and forth between the two systems via an orthogonal matrix $T_{3\times 3}$.

$$T_{3\times 3} = \begin{bmatrix} 1 & 0 & 0 \\ 0 & (1-j)/2 & (1+j)/2 \\ 0 & (1+j)/2 & (1-j)/2 \end{bmatrix}$$

Channel Independence Theorem

Channel independence may be demonstrated by a mathematical proof. The theorem is that if $x = \{x_0, x_1, \ldots, x_{n-1}\}$ is a vector of zero mean, independent, identically distributed random variables, and a and b are orthogonal vectors of length n, then $\langle a, x \rangle$ and $\langle b, x \rangle$ are independent. The angle bracket notation is used to denote the complex inner product of two vectors. For complex vectors, this is:

$$\langle x, y \rangle = \sum_{i=0}^{N-1} \overline{x_i} y_i$$
$$= \overline{x}^T y$$

First, the expected value of $\langle a, x \rangle \overline{\langle b, x \rangle}$ is expanded.

$$E[\langle a, x \rangle \overline{\langle b, x \rangle}] = E\left[\sum_{i=0}^{n-1} \overline{a_i} x_i \sum_{k=0}^{n-1} \overline{b_k x_k}\right]$$
$$= E\left[\sum_{i=0}^{n-1} \sum_{k=0}^{n-1} \overline{a_i} x_i b_k \overline{x_k}\right]$$
$$= \sum_{i=0}^{n-1} \sum_{k=0}^{n-1} \overline{a_i} b_k E[x_i \overline{x_k}]$$

Since $x_i$ and $x_k$ are independent and evenly distributed, $$E[x_i \overline{x_k}] = \begin{cases} 0 & \text{if } i \neq k, \text{ and} \\ 2\sigma^2 & \text{otherwise.} \end{cases}$$

Therefore $$E[\langle a, x \rangle \overline{\langle b, x \rangle}] = \sum_{i=0}^{n-1} \overline{a_i} b_k E[x_i \overline{x_k}]$$
$$= 2\sigma^2 \sum_{i=0}^{n-1} \overline{a_i} b_i$$
$$= 2\sigma^2 \langle a, b \rangle$$
$$= 0$$

The last line is true by the hypothesis that a and b are orthogonal.

This provides the proof of the theorem, but another way to view this is provided below that avoids getting down to the element level using properties of an inner product space and the fact that $$E[x \overline{x}^T] = \text{cov}[x]$$
$$= 2\sigma^2 I$$

where $2\sigma^2$ is the variance of each element of x.

$$E[\langle a, x \rangle \overline{\langle b, x \rangle}] = E[\langle a, x \rangle \langle x, b \rangle]$$
$$= E[\overline{a}^T x \overline{x}^T b]$$
$$= \overline{a}^T E[x \overline{x}^T] b$$
$$= 2\sigma^2 \overline{a}^T b$$
$$= 0$$

Covariance Analysis
The deterministic part of the four channels is $$v_4(x,y) = [\exp(j(-x-y)), \exp(j(x-y)), \exp(j(x+y)), \exp(j(-x+y))]$$

where x and y are the (scaled) AoAs in sine space.

First, the complex matrices are transformed into real matrices by converting each entry in the complex matrix into a skew symmetric 2×2 matrix using the isomorphism $$x + jy \to \begin{bmatrix} x & -y \\ y & x \end{bmatrix}$$

Complex vector entries are mapped to real vectors by taking the real and imaginary parts as separate entries $$x + jy \to \begin{bmatrix} x \\ y \end{bmatrix}$$

Let $m_3(x,y) = M_3 \, v_4(x,y)$ and $m_2(x,y) = M_2 \, v_4(x,y)$ be the measurement vectors for the three and two channel systems, respectively, at AoA $(x,y)$. The estimated AoA is a function of the measurements for some functions $f_2$ and $f_3$.

Under these complex-to-real transformations, $$M_2 \to \begin{bmatrix} 1 & 0 & 1 & 0 & 1 & 0 & 1 & 0 \\ 0 & 1 & 0 & 1 & 0 & 1 & 0 & 1 \\ 1 & 0 & 0 & -1 & -1 & 0 & 0 & 1 \\ 0 & 1 & 1 & 0 & 0 & -1 & -1 & 0 \end{bmatrix}$$

$$M_3 \to \begin{bmatrix} 1 & 0 & 1 & 0 & 1 & 0 & 1 & 0 \\ 0 & 1 & 0 & 1 & 0 & 1 & 0 & 1 \\ 1 & 0 & -1 & 0 & -1 & 0 & 1 & 0 \\ 0 & 1 & 0 & -1 & 0 & -1 & 0 & 1 \\ 1 & 0 & 1 & 0 & -1 & 0 & -1 & 0 \\ 0 & 1 & 0 & 1 & 0 & -1 & 0 & -1 \end{bmatrix}$$

$$v_4 \to \begin{bmatrix} \cos(-x-y) \\ \sin(-x-y) \\ \cos(x-y) \\ \sin(x-y) \\ \cos(x+y) \\ \sin(x+y) \\ \cos(-x+y) \\ \sin(-x+y) \end{bmatrix}$$

Let $A_2$ and $A_3$ be the Jacobian matrices of $m_2$ and $m_3$ $$A_2 = \left[\frac{\partial m_2}{\partial x} \quad \frac{\partial m_2}{\partial y}\right]_{2 \times 2}$$

$$A_3 = \left[\frac{\partial m_3}{\partial x} \quad \frac{\partial m_3}{\partial y}\right]_{3 \times 2}$$

Therefore, because the rows of $M_*$ are orthogonal, $$\text{cov}[a_*] = \sigma^2 (A_*^T M^T M A_*)^{-1}$$
$$= \sigma^2 (A_*^T A_*)^{-1}$$

where * is 2 or 3, and $\sigma^2 I$ is the covariance of $v_4$.

Comparing the eigenvalues of $\sigma^2(A_2^T A_2)^{-1}$ and $\sigma^2(A_3^T A_3)^{-1}$ at x=0 and y=0 reveals that the covariance of $a_2$ is twice that of $a_3$. This implies a difference in accuracy of $\sqrt{2}$.

Super Delta Monopulse Beamformer

As discussed above, some embodiments combine two information-sharing circular delta channels, such as $\Delta_1$ and $\Delta_2$, into a super delta channel that contains all of the direction finding information of the circular delta channels. This may be accomplished by the operation $$\Delta_{super} = \Delta_1^* \Sigma - \Delta_2 \Sigma^*$$

where * denotes the conjugation operator.

Per the above, the deterministic content of $\Delta_1$ and $\Delta_2$, and $s_1$ and $s_2$, respectively, are conjugates of one another (i.e., $s_1 = s_2^*$).

$$\Delta_1 = s_1 + n_1$$

$$\Delta_2 = s_2 + n_2$$

As such, $$\Delta_{super} = \Delta_1^* - \Delta_2$$

$$= 2s_1 + n_1^* - n_2$$

These are the same deltas, up to a constant phase offset that does not impact AoA estimation. The direction finding signal-to-noise ratio (SNR) in $\Delta_{super}$ is 3 decibels (dB) larger than either $\Delta_1$ or $\Delta_2$.

Some embodiments use analog components to create the super delta channel. However, if analog beam forming is not available, the same technique can be accomplished digitally. Voltages on channels are measured rapidly. For digital implementations, the two channels can be formed from the three channels via dot product matrix multiplication, as discussed above. A 33% savings on processing is realized over three channel implementations, but analog-to-digital (A-to-D) converter time is lost. As such, digital implementations may be less desirable than analog implementations due to these converters. However, both analog and digital implementations are within the scope of the present disclosure.

Figure 4:
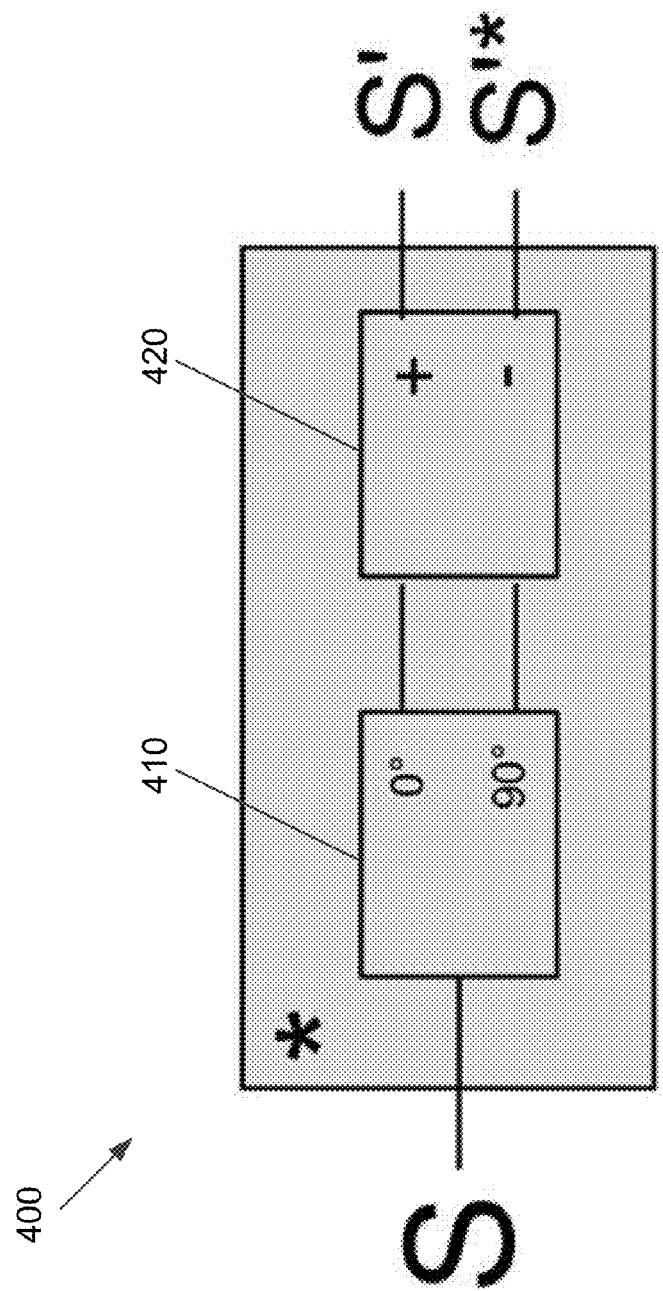
FIG. 4 is a block diagram illustrating a conjugation component, according to an embodiment of the present invention.

FIG. 4 is a block diagram illustrating a conjugation component 400, according to an embodiment of the present invention. Conjugation component 400 implements a transformation of the signal to produce a phase shifted signal and its complex conjugate. Conjugation component 400 includes two elements in some embodiments, a wideband phase shifter 410 and a sum/difference component 420. Wideband phase shifter 410 accepts a signal and has two output ports providing the signal and a 90° phase shifted signal. Sum/difference component 420 accepts two inputs and provides two outputs that are the sum and difference of the two inputs, respectively. These operations are combined to create a "hybrid" circuit.

A signal S is fed into conjugation component 400, and a sine wave (top) and a cosine wave (bottom) are extracted from signal S by wideband phase shifter 410. Sum/difference component 420 then performs addition and subtraction operations on the signals from wideband phase shifter 410. Adding the phase shifted signals yields signal S'. Subtracting the phase shifted signals gives signal S'*.

Figure 5:
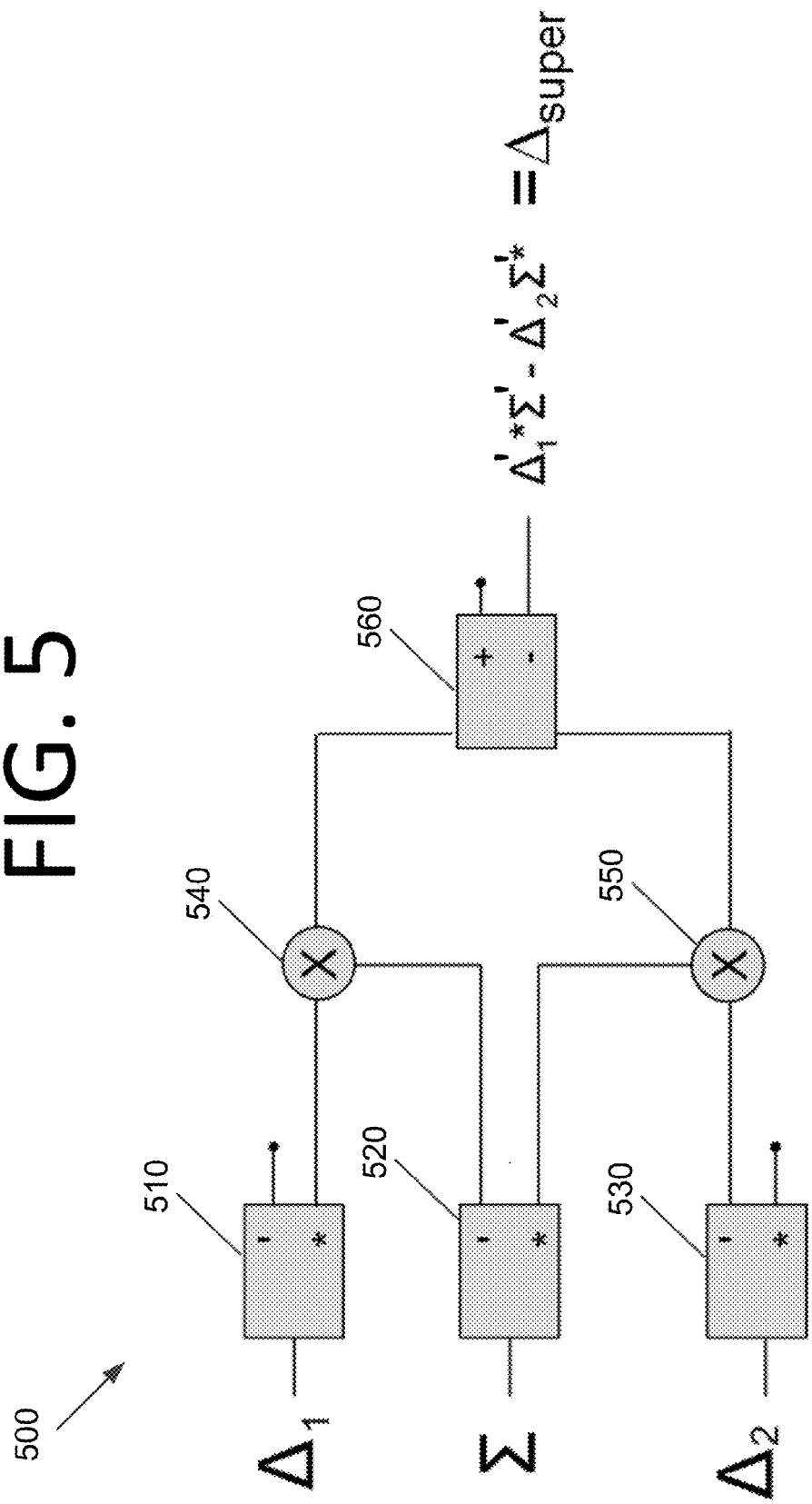
FIG. 5 is a circuit diagram illustrating an analog super delta monopulse beamformer, according to an embodiment of the present invention.

FIG. 5 is a circuit diagram illustrating an analog super delta monopulse beamformer 500, according to an embodiment of the present invention. Analog super delta monopulse beamformer 500 includes conjugation components 510, 520, 530, 560, as well as two mixers 540, 550, which may be heterodynes in some embodiments. The two circular deltas and the sum are fed into analog super delta monopulse beamformer 500. The primes denote that the signal has been phase shifted.

Conjugation component 510 receives circular delta $\Delta_1$ and outputs the conjugation thereof $\Delta'^*_1$. Conjugation component 520 receives circular delta $\Sigma$ and outputs both $\Sigma'$ the conjugation thereof $\Sigma'^*$. Conjugation component 530 receives circular delta $\Delta_2$ and outputs $\Delta'_2$.

Mixer 540 mixes, or combines, $\Delta'^*_1$ from conjugation component 510 and $\Sigma'$ from conjugation component 520 to produce $\Delta'^*_1 \Sigma'$. Mixer 550 mixes $\Delta'_2$ from conjugation component 530 and $\Sigma'^*$ from conjugation component 520 to produce $\Delta'_2 \Sigma'^*$. $\Delta'^*_1 \Sigma'$ and $\Delta'_2 \Sigma'^*$ are then fed into conjugation component 560 to produce $\Delta'^*_1 \Sigma' - \Delta'_2 \Sigma'^*$ from the subtraction output of conjugation component 560. This is the super delta channel.

The super delta channel output by super delta monopulse beamformer 500 and the signal amplitude (i.e., the receive amplitude of the signal of interest; the norm of the sum channel) are all that is required to perform direction finding. The direction angles in sine space will be given by real and imaginary parts of the monopulse ratio $|\Sigma|/\Delta_{super}$.

In some embodiments, each quadrant of the aperture may be digitized. A digital beam former can then be implemented in software to form the super delta channel. Two methods to obtain the super delta channel digitally are described. The first method uses the digital data streams coming from the array quadrants themselves. The second method uses digital data streams coming from the three-channel system including $[\Sigma, \Delta_{az}, \Delta_{el}]$. If A, B, C, and D are taken to be the complex data streams coming from each quadrant, then the super delta is formed by multiplying each sample set $\{a, b, c, d\}$ taken from quadrant streams $\{A, B, C, D\}$ by the beam forming matrix $$\begin{bmatrix} \Sigma \\ \Delta_1 \\ \Delta_2 \end{bmatrix} = \begin{bmatrix} 1 & 1 & 1 & 1 \\ 1 & j & -1 & -j \\ 1 & -j & -1 & j \end{bmatrix} \begin{bmatrix} a \\ b \\ c \\ d \end{bmatrix}$$

The super delta is then given by the complex conjugate of $\Delta_1 - \Delta_2$:

$$\Delta_{super} = \overline{\Delta_1} - \Delta_2$$

The second method uses the complex data streams measured from the analog $\Sigma, \Delta_{az}, \Delta_{el}$ channels.

$$\begin{bmatrix} \Sigma \\ \Delta_1 \\ \Delta_2 \end{bmatrix} = \begin{bmatrix} 1 & 0 & 0 \\ 0 & (1-j)/2 & (1+j)/2 \\ 0 & (1+j)/2 & (1-j)/2 \end{bmatrix} \begin{bmatrix} \Sigma \\ \Delta_{az} \\ \Delta_{el} \end{bmatrix}$$

Then, as before, $$\Delta_{super} = \overline{\Delta_1} - \Delta_2$$

Table 1 compares the Cartesian (three channel), circular (two channel), and super delta approaches to beamforming

TABLE 1

Beamforming Approach Attributes

| | Number of Channels | Angle Accuracy Factor |
|---|---|---|
| Cartesian | 3 | 1 |
| Circular | 2 | $\sqrt{2}$ |
| Super Delta | 2 | 1 |

An angle estimation factor of 1 is superior to an angle estimation factor of $\sqrt{2}$ which is ~4.414. As can be seen from Table 1, the super delta approach offers the benefits of the Cartesian and circular approaches without the drawbacks thereof.

Figure 6:
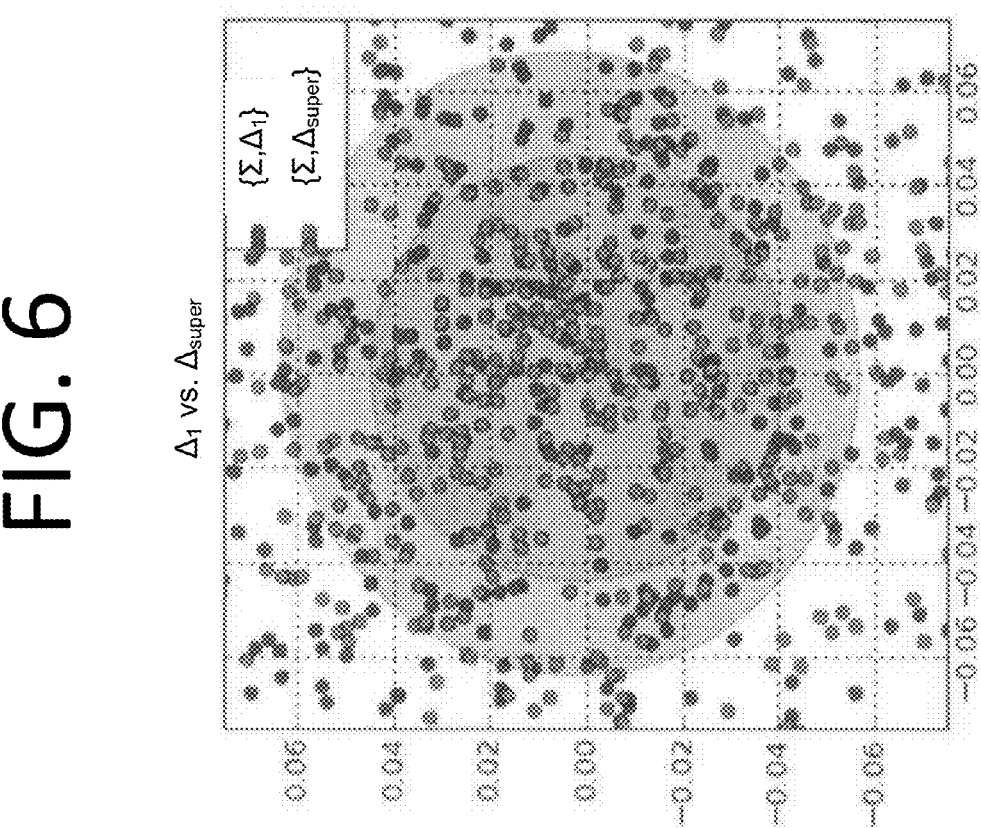
FIG. 6 is a graph illustrating a simulation of AoA errors and a circle denoting the mean error of 500 Monte Carlo trials comparing a single circular delta channel to a super delta channel, according to an embodiment of the present invention.

FIG. 6 is a graph 600 illustrating a simulation of AoA errors and a circle denoting the mean error of 500 Monte Carlo trials comparing a single circular delta channel to a super delta channel, according to an embodiment of the present invention. The super delta channel implementation provides superior AoA to the conventional two channel implementation.

Figure 7:
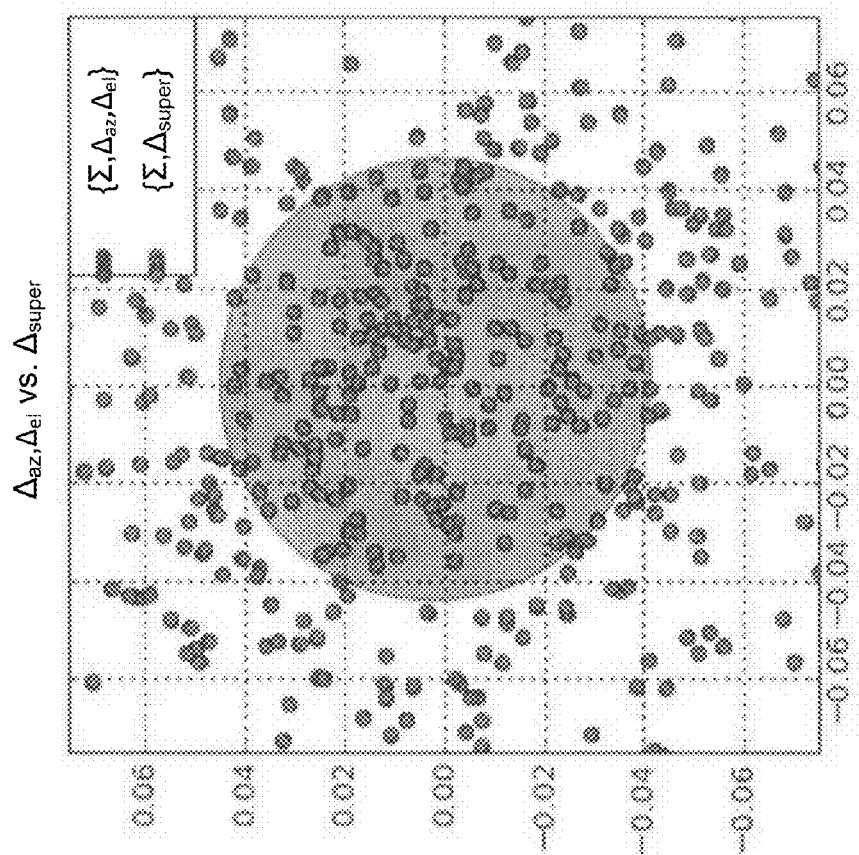
FIG. 7 is a graph illustrating a simulation of AoA errors and a circle denoting the mean error of 500 Monte Carlo trials comparing $\Delta_{az}$ and $\Delta_{el}$ performance to a super delta channel, according to an embodiment of the present invention.

FIG. 7 is a graph 700 illustrating a simulation of AoA errors and a circle denoting the mean error of 500 Monte Carlo trials comparing $\Delta_{az}$ and $\Delta_{el}$ performance to a super delta channel, according to an embodiment of the present invention. As can be seen, the super delta channel implementation provides the same AoA at the three channel system.

Figure 8:
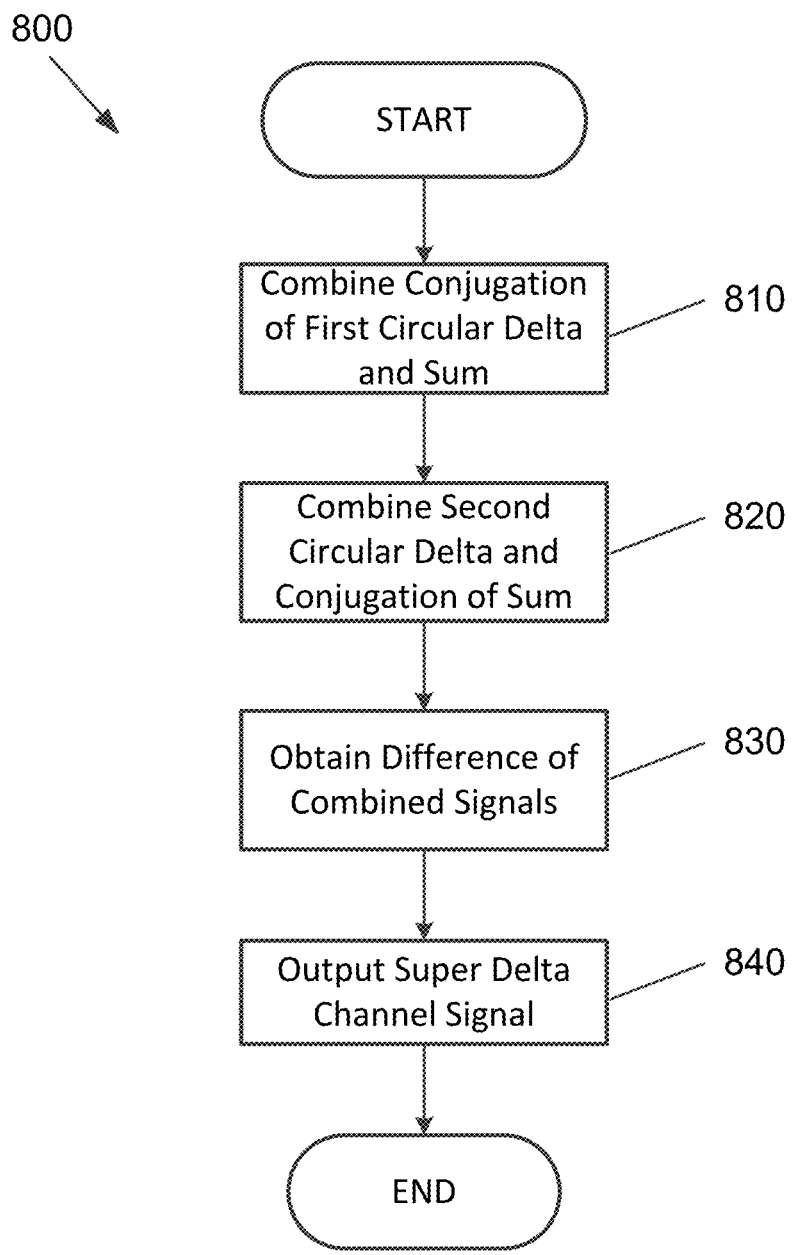
FIG. 8 is a flowchart illustrating a method for performing direction finding, according to an embodiment of the present invention.

FIG. 8 is a flowchart 800 illustrating a method for performing direction finding, according to an embodiment of the present invention. In some embodiments, the method may be performed, for example, by analog super delta monopulse beamformer 500 of FIG. 5. The method begins with combining a conjugation of a first independent circular delta channel signal with a sum signal to form a first combined signal that serves as a minuend of a super delta channel signal at 810. A second independent circular delta channel signal is combined with a conjugation of the sum signal to form a second combined signal that serves as a subtrahend of the super delta channel signal at 820.

The second combined signal is subtracted from the first combined signal to form the super delta channel signal as a difference between the minuend and the subtrahend at 830. The super delta channel signal is output at 840, and the method ends.

Figure 9:
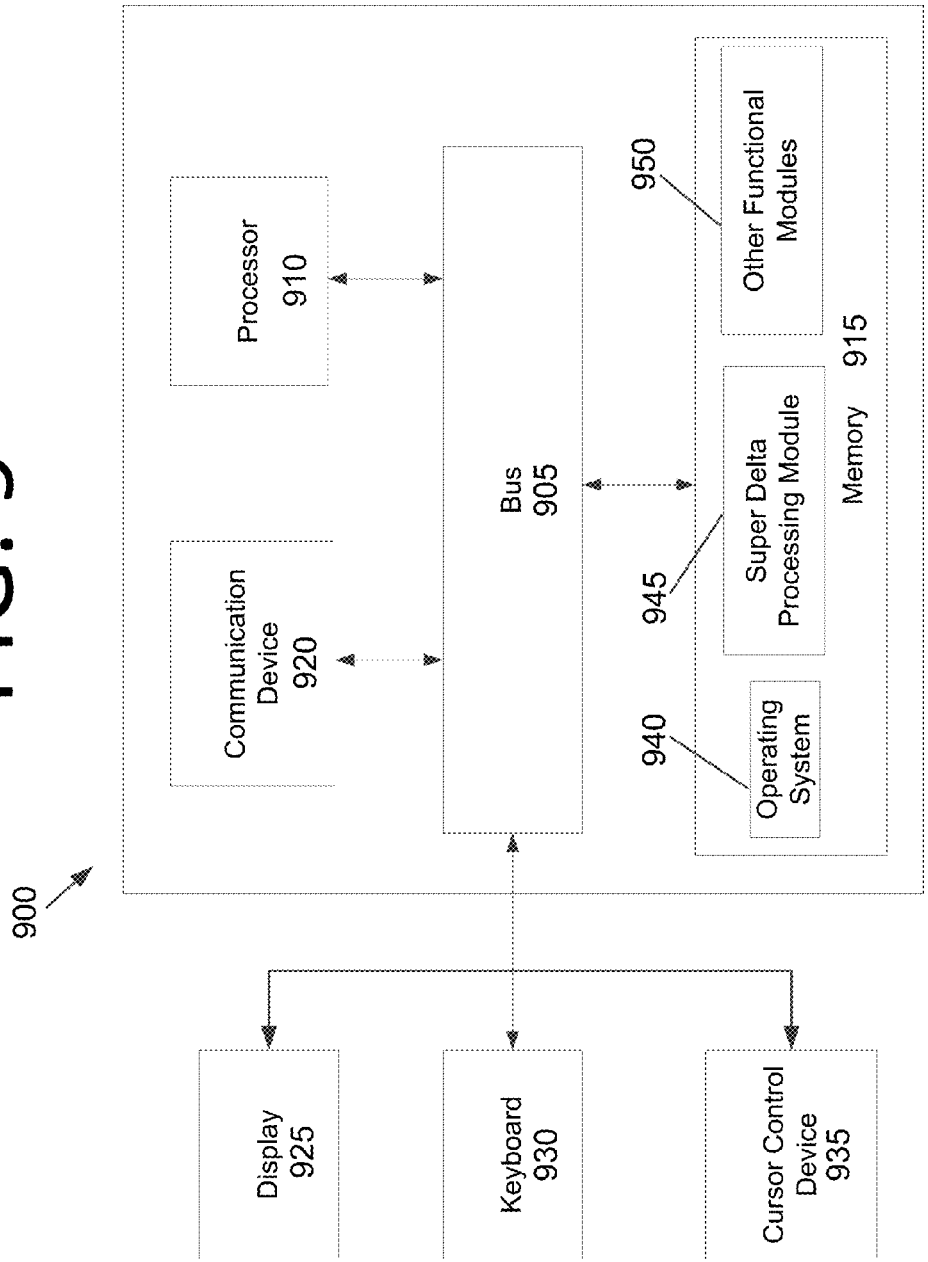
FIG. 9 illustrates a computing system for a digital implementation of a super delta monopulse beamformer, according to an embodiment of the present invention.

FIG. 9 illustrates a computing system for a digital implementation of a super delta monopulse beamformer, according to an embodiment of the present invention. System 900 includes a bus 905 or other communication mechanism for communicating information, and a processor 910 coupled to bus 905 for processing information. Processor 910 may be any type of general or specific purpose processor, including a central processing unit ("CPU") or application specific integrated circuit ("ASIC"). System 900 further includes a memory 915 for storing information and instructions to be executed by processor 910. Memory 915 can be comprised of any combination of random access memory ("RAM"), read only memory ("ROM"), flash memory, cache, static storage such as a magnetic or optical disk, or any other types of non-transitory computer-readable media or combinations thereof. Additionally, system 900 includes a communication device 920, such as a transceiver, to wirelessly provide access to a telecommunications network.

Non-transitory computer-readable media may be any available media that can be accessed by processor 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 910 is further coupled via bus 905 to a display 925, such as a Liquid Crystal Display ("LCD"), for displaying information to a user. A keyboard 930 and a cursor control device 935, such as a computer mouse, are further coupled to bus 905 to enable a user to interface with system 900. However, in certain embodiments such as those for mobile computing implementations, a physical keyboard and mouse may not be present, and the user may interact with the device solely through display 925 and/or a touchpad (not shown). Any type and combination of input devices may be used as a matter of design choice.

In one embodiment, memory 915 stores software modules that provide functionality when executed by processor 910. The modules include an operating system 940 for system 900. The modules further include a super delta processing module 945 that is configured to process digital signals that system 900 receives from one or analog-to-digital converters configured to provide quadrant signals A, B, C, and D. System 900 may include one or more additional functional modules 950 that include additional functionality One skilled in the art will appreciate that a "system" could be embodied as a personal computer, a server, a console, a personal digital assistant ("PDA"), a cell phone, a tablet computing device, or any other suitable computing device, or combination of devices. However, in many embodiments, system 900 will be implemented as electronics and software of a vehicle control system. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
forming, by an analog beamformer, a super delta channel signal; and
outputting, by the analog beamformer, the super delta channel signal.

2. The method of claim 1, further comprising:
combining, by the analog beamformer, a conjugation of a first independent circular delta channel signal with a sum signal to form a first combined signal that serves as a minuend of the super delta channel signal.

3. The method of claim 2, further comprising:
combining, by the analog beamformer, a second independent circular delta channel signal with a conjugation of the sum signal to form a second combined signal that serves as a subtrahend of the super delta channel signal.

4. The method of claim 3, wherein the sum signal $\Sigma$, the first independent circular delta channel $\Delta_1$, and the second independent circular delta channel $\Delta_2$ are represented by $$\begin{bmatrix} \Sigma \\ \Delta_1 \\ \Delta_2 \end{bmatrix} = \begin{bmatrix} 1 & 1 & 1 & 1 \\ 1 & j & -1 & -j \\ 1 & -j & -1 & j \end{bmatrix} \begin{bmatrix} A \\ B \\ C \\ D \end{bmatrix}$$

where j is an imaginary number $\sqrt{-1}$, and A is a lower left quadrant, B is a lower right quadrant, C is an upper right quadrant, and D is an upper left quadrant, respectively, of an aperture.

5. The method of claim 3, further comprising:
subtracting, by the analog beamformer, the second combined signal from the first combined signal to form the super delta channel signal.

6. The method of claim 3, wherein a direction finding signal-to-noise ratio (SNR) of the super delta channel signal is 3 decibels larger than a SNR of the first independent circular delta channel signal and the second independent circular delta channel signal.

7. The method of claim 1, wherein the analog beamformer using the super delta channel signal and a sum signal of four aperture quadrants has an accuracy of a three channel system using an azimuth delta, an elevation delta, and the sum signal of the four aperture quadrants.

8. An apparatus, comprising:
a plurality of conjugation components; and
at least two mixers, wherein
the plurality of conjugation components and the at least two mixers are configured to produce a super delta channel signal.

9. The apparatus of claim 8, wherein at least one of the plurality of conjugation components is configured to output a conjugation of an independent circular delta channel.

10. The apparatus of claim 8, wherein the at least two mixers comprise:
a first mixer configured to combine a conjugation of a first independent circular delta channel signal with a sum signal to form a first combined signal; and
a second mixer configured to combine a second independent circular delta channel signal with a conjugation of the sum signal to form a second combined signal.

11. The apparatus of claim 10, wherein one of the plurality of conjugation components is configured to subtract the second combined signal from the first combined signal to produce the super delta channel signal.

12. The apparatus of claim 10, wherein the sum signal $\Sigma$, the first independent circular delta channel $\Delta_1$, and the second independent circular delta channel $\Delta_2$ are represented by $$\begin{bmatrix} \Sigma \\ \Delta_1 \\ \Delta_2 \end{bmatrix} = \begin{bmatrix} 1 & 1 & 1 & 1 \\ 1 & j & -1 & -j \\ 1 & -j & -1 & j \end{bmatrix} \begin{bmatrix} A \\ B \\ C \\ D \end{bmatrix}$$

where j is an imaginary number $\sqrt{-1}$, and A is a lower left quadrant, B is a lower right quadrant, C is an upper right quadrant, and D is an upper left quadrant, respectively, of an aperture.

13. The apparatus of claim 10, wherein a direction finding signal-to-noise ratio (SNR) of the super delta channel signal is 3 decibels larger than a SNR of the first independent circular delta channel signal and the second independent circular delta channel signal.

14. The apparatus of claim 8, wherein the apparatus, using the super delta channel signal and a sum signal of four aperture quadrants, has an accuracy of a three channel system using an azimuth delta, an elevation delta, and the sum signal of the four aperture quadrants.

15. A computer program embodied on a non-transitory computer-readable medium, the computer program configured to cause at least one processor to:
receive digital data streams comprising direction finding information;
process the received digital data streams to produce a super delta channel signal; and
output the super delta channel signal.

16. The computer program of claim 15, wherein the received digital data comprises digital data streams from four array quadrants A, B, C, and D.

17. The computer program of claim 16, wherein the program is further configured to cause the at least one processor to multiply each sample set {a, b, c, d} taken from quadrant streams for quadrants A, B, C, and D by a beamforming matrix $$\begin{bmatrix} \Sigma \\ \Delta_1 \\ \Delta_2 \end{bmatrix} = \begin{bmatrix} 1 & 1 & 1 & 1 \\ 1 & j & -1 & -j \\ 1 & -j & -1 & j \end{bmatrix} \begin{bmatrix} a \\ b \\ c \\ d \end{bmatrix}.$$

18. The computer program of claim 17, wherein the program is further configured to cause the at least one processor to produce the super delta channel signal using a complex conjugate of $\Delta_1 - \Delta_2$.

19. The computer program of claim 15, wherein the received digital data comprises digital data streams corresponding to an analog sum ($\Sigma$), azimuth delta ($\Delta_{az}$), and elevation delta ($\Delta_{el}$) from a three channel system.

20. The computer program of claim 19, wherein the digital data streams comprise complex data streams of the form $$\begin{bmatrix} \Sigma \\ \Delta_1 \\ \Delta_2 \end{bmatrix} = \begin{bmatrix} 1 & 0 & 0 \\ 0 & (1-j)/2 & (1+j)/2 \\ 0 & (1+j)/2 & (1-j)/2 \end{bmatrix} \begin{bmatrix} \Sigma \\ \Delta_{az} \\ \Delta_{el} \end{bmatrix}.$$

21. The computer program of claim 20, wherein the program is further configured to cause the at least one processor to produce the super delta channel signal using a complex conjugate of $\Delta_1 - \Delta_2$.

* * * * *